United States Patent
Tuukkanen

(10) Patent No.: US 10,338,786 B2
(45) Date of Patent: Jul. 2, 2019

(54) METHOD AND APPARATUS FOR PRESENTING TASK-RELATED OBJECTS IN AN AUGMENTED REALITY DISPLAY

(71) Applicant: HERE GLOBAL B.V., Eindhoven (NL)

(72) Inventor: Marko Tapio Tuukkanen, Schlenzer (DE)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 15/990,177

(22) Filed: May 25, 2018

(65) Prior Publication Data
US 2018/0275848 A1  Sep. 27, 2018

Related U.S. Application Data

(63) Continuation of application No. 13/774,543, filed on Feb. 22, 2013.

(51) Int. Cl.
*G06F 17/30* (2006.01)
*G06F 3/0484* (2013.01)

(52) U.S. Cl.
CPC ...... *G06F 3/0484* (2013.01); *G06F 17/30244* (2013.01)

(58) Field of Classification Search
CPC ... G06F 3/0484; G06F 17/30; G06F 17/30244
See application file for complete search history.

(56) References Cited

U.S. PATENT DOCUMENTS

| 5,961,446 A | 10/1999 | Beller et al. |
| 8,948,935 B1 | 2/2015 | Peeters et al. |
| 2002/0089544 A1 | 7/2002 | Jahn et al. |
| 2002/0167536 A1 | 11/2002 | Valdes et al. |
| 2005/0203683 A1 | 9/2005 | Olsen et al. |
| 2010/0159434 A1 | 6/2010 | Lampotang et al. |
| 2010/0287500 A1 | 11/2010 | Whitlow et al. |
| 2012/0075343 A1 | 3/2012 | Chen et al. |
| 2013/0046592 A1 | 2/2013 | Ross |
| 2013/0342568 A1 | 12/2013 | Ambrus et al. |
| 2014/0039359 A1 | 2/2014 | Madanat |

FOREIGN PATENT DOCUMENTS

| EP | 0019662 A1 | 12/1980 |
| WO | 02/080106 A2 | 10/2002 |

OTHER PUBLICATIONS

Notification of Transmittal of the International Search Report and the Written Opinion of the International Searching Authority, or the Declaration; International Search Report; Written Opinion on the International Searching Authority for International Application No. PCT/EP2014/052424, dated Apr. 11, 2014, 9 pages.

*Primary Examiner* — Jacinta M Crawford
*Assistant Examiner* — Phuc N Doan
(74) *Attorney, Agent, or Firm* — Ditthavong & Steiner, P.C.

(57) ABSTRACT

An approach is provided for causing a presentation in an augmented reality user interface for user guidance. The approach involves causing a presentation of one or more indications of one or more parts in an augmented reality user interface, wherein the one or more parts are associated with at least one task. The approach also involves causing a presentation of one or more guides for aligning the one or more indications with the one or more parts in the augmented reality user interface.

18 Claims, 14 Drawing Sheets

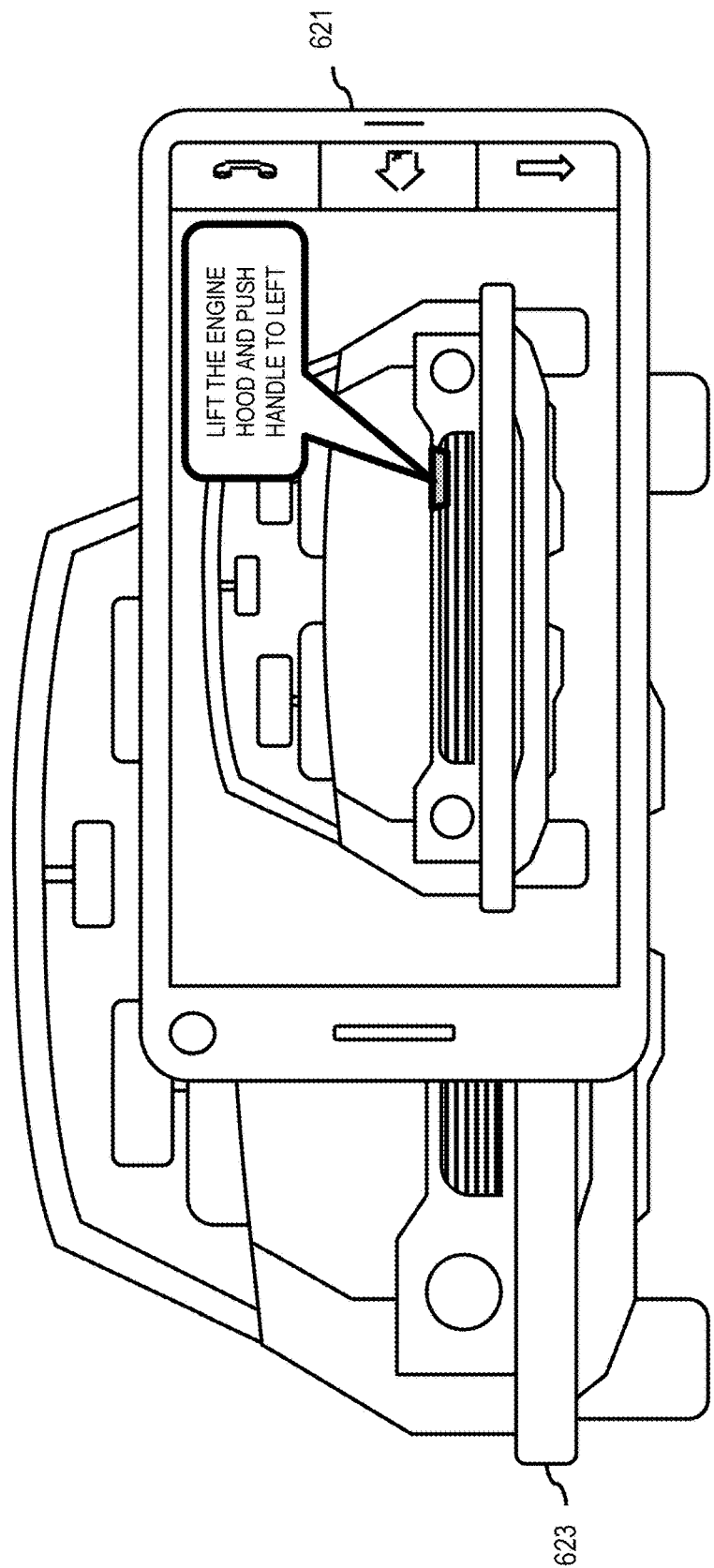

METHOD AND APPARATUS FOR PRESENTING TASK-RELATED OBJECTS IN AN AUGMENTED REALITY DISPLAY

RELATED APPLICATION

This application is a continuation of U.S. patent application Ser. No. 13/774,543, filed Feb. 22, 2013, entitled "METHOD AND APPARATUS FOR PRESENTING TASK-RELATED OBJECTS IN AN AUGMENTED REALITY DISPLAY", which is incorporated herein by reference in its entirety.

BACKGROUND

Service providers and device manufacturers (e.g., wireless, cellular, etc.) are continually challenged to deliver value and convenience to consumers by, for example, providing compelling network services. With the expanding use of mobile devices, consumers' demand to have valuable services delivered to these devices has increased. One area of development has been the proliferation of mobile communication devices with various sensors, enabling them to collect information associated with the physical environment. For example, a user may be in a vehicle (e.g., an automobile, a boat, a motorcycle, a bicycle, etc.) where in addition to a user device (e.g., a tablet, a mobile device, etc.), there may be various sensors for determining information associated with the vehicle, the user, the user environment, and the like. Unfortunately, there is currently no convenient means of providing a user friendly augmented reality display of task-related objects associated with the physical environment for assistance purposes. Such drawback diminishes the effectiveness and efficiency of the services rendered. Therefore, service providers and device manufacturers face significant technical challenges in presenting task-related objects in an augmented reality display to enhance user convenience.

SOME EXAMPLE EMBODIMENTS

Therefore, there is a need for an approach for causing a presentation of one or more indications of one or more parts associated with at least one task, alongside guides for aligning the one or more indications with the one or more parts in the augmented reality user interface.

According to one embodiment, a method comprises causing, at least in part, a presentation of one or more indications of one or more parts in the augmented reality user interface, wherein the one or more parts are associated with at least one task. The method also comprises causing, at least in part, a presentation of one or more guides for aligning the one or more indications with the one or more parts in the augmented reality user interface.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a presentation of one or more indications of one or more parts in the augmented reality user interface, wherein the one or more parts are associated with at least one task. The apparatus also causes, at least in part, a presentation of one or more guides for aligning the one or more indications with the one or more parts in the augmented reality user interface.

According to another embodiment, a computer-readable storage medium carries one or more sequences of one or more instructions which, when executed by one or more processors, cause, at least in part, an apparatus to cause, at least in part, a presentation of one or more indications of one or more parts in the augmented reality user interface, wherein the one or more parts are associated with at least one task. The apparatus also causes, at least in part, a presentation of one or more guides for aligning the one or more indications with the one or more parts in the augmented reality user interface.

According to another embodiment, an apparatus comprises means for causing, at least in part, a presentation of one or more indications of one or more parts in the augmented reality user interface, wherein the one or more parts are associated with at least one task. The apparatus also comprises means for causing, at least in part, a presentation of one or more guides for aligning the one or more indications with the one or more parts in the augmented reality user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6A-6F are diagrams of user interfaces utilized in the processes of FIGS. 3-5, according to various embodiments;

DESCRIPTION OF SOME EMBODIMENTS

Examples of a method, apparatus, and computer program for causing a presentation of one or more indications of one or more parts associated with at least one task, alongside guides for aligning the one or more indications with the one or more parts in the augmented reality user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
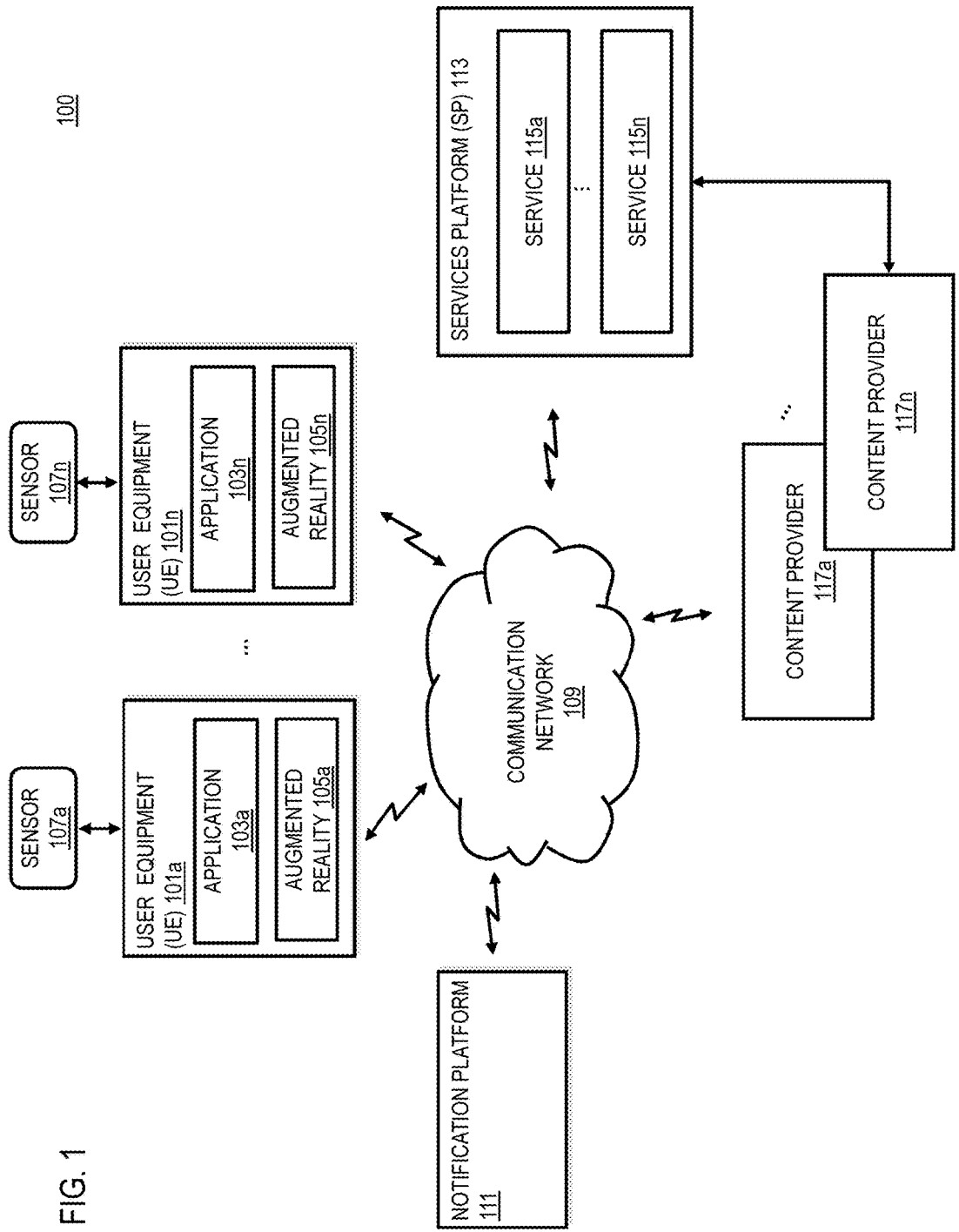
FIG. 1 is a diagram of a system capable of causing a presentation of one or more indications of one or more parts associated with at least one task, alongside guides for aligning the one or more indications with the one or more parts in the augmented reality user interface, according to one embodiment.

FIG. 1 is a diagram of a system capable of causing a presentation of one or more indications of one or more parts associated with at least one task, alongside guides for aligning the one or more indications with the one or more parts in the augmented reality user interface, according to one embodiment. As discussed previously, it is currently challenging to provide an augmented reality presentation of one or more parts associated with at least one task for user assistance. The existing mobile devices do not properly utilize the technology to establish an augmented reality user interface for user guidance. This is due, in part, to the inability of the device or services of the device to accurately utilize the available technologies. Since mobile phones have so far emerged as the most personalized and the most reachable communication device, employing a series of sensors available on today's ubiquitous mobile devices, to achieve a user friendly augmented reality presentation for user assistance may improve user convenience and add value to a mobile phone to make it more competitive.

To address this problem, a system 100 of FIG. 1 introduces the capability to cause a presentation of one or more indications of one or more parts associated with at least one task, alongside guides for aligning the one or more indications with the one or more parts in the augmented reality user interface As shown in FIG. 1, the system 100 comprises user equipment (UE) 101a-101n (collectively referred to as UE 101) that may include or be associated with applications 103a-103n (collectively referred to as applications 103), augmented reality application 105a-105n (collectively referred to as augmented reality 105) and sensors 107a-107n (collectively referred to as sensors 107). In one embodiment, the UEs 101 have connectivity to a notification platform 111 via the communication network 109.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that may perform various processes and/or functions at the UE 101. In one embodiment, the applications 103 may be media (e.g., audio, video, images, etc.) player applications, social networking applications, navigational applications, calendar applications, content (e.g., audio, video, images, etc.) provisioning services, etc. In one embodiment, one of the applications 103a at the UE 101 may act as a client for the notification platform 111 and perform one or more functions associated with the functions of the notification platform 111. In one embodiment, the applications 103 may be a transfer application to transfer information between a first UE 101a to a second UE 101n. In one scenario, the application 103a of the first UE 101a can be set to a mode to initiate a transfer while the application 103n of the second UE 101n can be set to a mode to receive a transfer.

In one embodiment, the augmented reality 105 enables an augmented reality display to generate real-time representations of the images for one or more collaborative applications environments with virtual computer-generated imagery. More specifically, the view generated by the augmented reality 105 for one or more collaborative applications presented in any one of the participating UEs 101 is based, at least in part, on an orientation (e.g., location, directional heading, tilt angle, etc.) of the UE 101 in relation to the physical environment. In one scenario, when the UE 101 is operating in an orientation, for instance, facing the direction of the physical environment, the augmented reality 105 may depict, for instance, a virtual window showing a portion of the physical environment for one or more collaborative applications that is visible from the perspective of the UE 101. In one scenario, where a user is operating a cell phone with integrated camera recording the user's current physical environment. The augmented reality 105 operable on the cell phone can interact with the camera, and any other sensory mechanisms of the cell phone, to overlay various graphic elements atop the recorded image or a virtual representation of the recorded image to show the visible portions of the physical environment for one or more collaborative applications and the objects contained therein.

In one embodiment, the sensors 107 may be any type of sensor. In certain embodiments, the sensors 107 may include, for example, a camera/imaging sensor for gathering image data, an audio recorder for gathering audio data, a global positioning sensor for gathering location data, a position sensor or gyroscope for detecting device orientation and/or tilt, a network detection sensor for detecting wireless signals or network data, temporal information and the like. This information is provided to the notification platform 111 for processing to determine one or more information associated with a physical environment for one or more representation in an augment reality user interface of UE 101.

The communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof. In one scenario, UE 101a may be paired with the UE 101n to enable the UE 101a to initiate a transfer of one or more information. In one embodiment, one or more information can be quickly transferred by tapping the first UE 101a and the second UE 101n together. The tapping can, for instance, initiate a transfer over a near field communication (NFC) link between the first UE 101a and the second UE 101n. The information transfer can include one or more identifiers (e.g., a Mobile Subscriber Integrated Services Digital Network Number (MSISDN), an International Mobile Subscriber Identity (EVISI), a wireless pairing identifier such as a BLUETOOTH address, or other UE 101 identifier that can be used by another device or network to identify the UEs 101. The first UE 101a and the second UE 101n can then utilize one of the identifiers to create a wireless link (e.g., a wireless local area network (WLAN) connection, a BLUETOOTH link, a network link over cellular communication, etc.) between the UEs 101.

In one embodiment, the notification platform 111 may be a platform with multiple interconnected components. The notification platform 111 may include multiple servers, intelligent networking devices, computing devices, components and corresponding software for performing the function of causing a presentation of one or more indications of one or more parts associated with at least one task, alongside guides for aligning the one or more indications with the one or more parts in the augmented reality user interface. In addition, it is noted that the notification platform 111 may be a separate entity of the system 100, a part of the one or more services 115 of the service platform 113, or included within the UE 101 (e.g., as part of the application 103).

In this way, the system 100 resolves problems associated with presenting a user friendly augmented reality display of the determined information from the physical environment, for example, by providing an outline view of the determined parts associated with one or more task. In one scenario, notification platform 111 may determine one or more defects associated with a car by processing the sensor information and/or the telematics information associated with the car. Subsequently, the notification platform 111 may determine one or more depictions for the one or more determined parts associated with fixing of the determined defect in the car. In one scenario, the notification platform 111 may determine that the front left tire of the car needs to be changed. The notification platform 111 may generate an augmented reality display of the front tire with several user interface elements, for instance, color patterns, labels, arrows etc., to help the user identify the parts quicker. Then, the user may compare the augmented reality depiction of the parts to the actual parts of the vehicle to cause a match. Further, the user may be provided with a step by step guide on how to change the tires. In this manner, the notification platform 111 enables inexperienced users to recognize defects and provide instructions to fix the defect. On the other hand, the presentation may be geared to different skill levels and may be used by professionals as well.

In one scenario, a UE 101 may capture an image of a tire, whereby the notification platform 111 may process the image to determine any defect. The notification platform 111 may present one or more notification to the user in an augmented reality user interface requesting the user to change the tire based on the wear and tear determined from the image captured. The user may move around the car with the display, and compare and match the display with the damaged tire. The notification platform may either provide a step by step guide to change the tire or the location of the nearby auto repair shop based, at least in part, on user interaction. In one scenario, the notification platform 111 may cause a presentation based, at least in part, on the location of the car, the location of the user, the direction where the user is looking etc.

In one scenario, the notification platform 111 may provide other information, for instance, the driver seat may be dirty and needs cleaning, therefore the notification platform 111 may alert the user with information on cleaning the seat and may recommend cleaning materials. In one scenario, the notification platform 111 may allow sharing of the augmented reality display of the one or more guides between multiple users, for instance, the occupants of a car may co-ordinate actions between them to change tires, whereby the notification platform 111 may process user action, if user A has taken out the spare tire and the jack, User B may be informed on how to place the jack under the frame near the tire that needs to be changed. This is a co-ordination mechanism. In one scenario, the augmented reality display may be exchanged by tapping the UE 101*a* and UE 101*n* together. When two UE 101's are tapped together, an NFC link between the two UEs 101 may be created to transfer information.

In one embodiment, the services platform 113 may include any type of service. By way of example, the services platform 113 may include mapping services, navigation services, social networking services, content (e.g., text, images, etc.) provisioning services, application services, storage services, contextual information determination services, location based services, information (e.g., weather, news, etc.) based services, etc. In one embodiment, the services platform 113 may interact with the UE 101, the notification platform 111 and the content providers 117 to supplement or aid in the processing of the content information. By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, and interests, and provides for data portability.

The content providers 117 may provide content to the UE 101, the notification platform 111, and the services 115 of the services platform 113. The content provided may be any type of content, such as textual content, image content, video content etc. In one embodiment, the content providers 117 may provide content that may supplement content of the applications 103, augmented reality 105, the sensors 107, or a combination thereof. In one embodiment, the content providers 117 may also store content associated with the UE 101, the notification platform 111, and the services 115 of the services platform 113. In one embodiment, the content providers 117 may manage access to a central repository of data, and offer a consistent, standard interface to data.

By way of example, the UE 101, the notification platform 111, the services platform 113, and the content providers 117 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
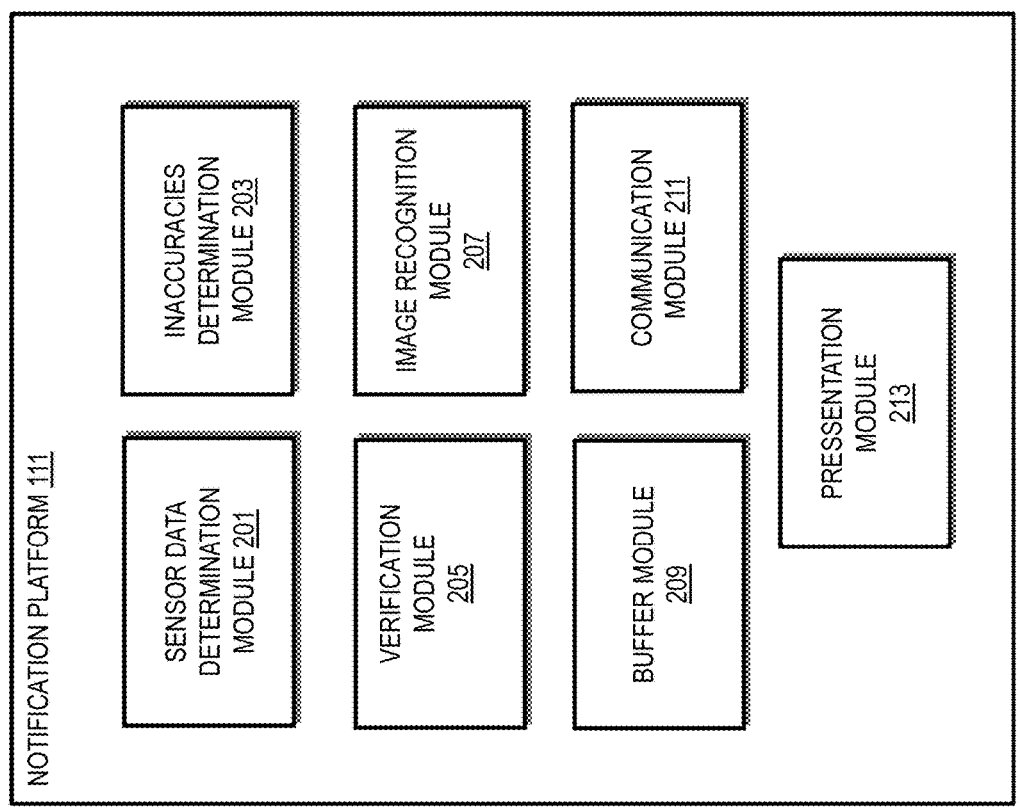
FIG. 2 is a diagram of the components of notification platform 111, according to one embodiment.

FIG. 2 is a diagram of the components of the notification platform 111, according to one embodiment. By way of example, the notification platform 111 includes one or more components for causing a presentation of one or more indications of one or more parts associated with at least one task, alongside guides for aligning the one or more indications with the one or more parts in the augmented reality user interface. It is contemplated that the functions of these components may be combined in one or more components or performed by other components of equivalent functionality. In this embodiment, the notification platform 111 includes a sensor data determination module 201, an inaccuracies determination module 203, a verification module 205, an image recognition module 207, a buffer module 209, a communication module 211, and a presentation module 213.

In one embodiment, the sensor data determination module 201 may enable determination of sensor data obtained from the sensors. The sensors may, for instance, include a camera/imaging sensor for gathering image data, an audio recorder for gathering audio data, a global positioning sensor for gathering location data, a position sensor or gyroscope for detecting device orientation and/or tilt, a network detection sensor for detecting wireless signals or network data, temporal information and the like. In addition, in one embodiment, the sensor data may be collected via one or more standardized sensor interfaces or systems such as an On-Board Diagnostics (OBD) sensor interface or system. The OBD sensor interface may, for example, be installed in vehicles as a standard connecting port. Through the OBD sensor interface, operating parameters of a vehicle and the sensor data may be obtained in real time. The OBD sensors may include vehicle speed sensors, wheel speed sensors, steering angle sensors, G-Force sensors, air temperature sensors, barometric sensors, oxygen sensors, airflow sensors, etc. The sensor data may be obtained through a device connector to the OBD sensor interface. The sensor data may be also collected via one or more sensors associated with the device. The device may include mobile computers, mobile phones, navigation systems, etc. The device may be connected with the one or more sensors including barometric sensors, speed sensors, gyro sensors, compass sensors, light sensors, GPS, etc.

In one embodiment, the inaccuracies determination module 203 may enable determination of inaccuracies of the performance of a service (e.g., an initial/default service). By way of example, the inaccuracies of the performance may be determined based on slow or delayed processing of the service, frequent buffering, discontinuation of service, a reduction in a level of accuracy, or a combination thereof. In one scenario, slow or delayed processing may, for instance, include delay in starting a vehicle due to corroded cable connection in the engine. Subsequently, the notification platform 111 may notify the user to clean or replace the cables, and may display an augmented reality user interface on how to clean or change the cables.

In one embodiment, the verification module 205 may enable verification of the one or more conditions. For example, conditions determined based on the sensor data may be verified using the other data, and conditions determined based on the other data may be verified using the sensor data. In one use case, vehicle sensor data may be verified using VIN codes, service manual of the vehicles etc.

In one embodiment, an image recognition module 207 analyzes the data in order to classify the data. The image recognition module 207 processes the data by way of one or more known image recognition techniques. Recognition techniques may include the assignment of output values (labels or tags) to a given input value. Another approach may include classification processing, wherein the image recognition module 207 assigns each input value to one of a given set of classes. In one embodiment, the image recognition module 207 may create interface based, at least in part, on the data provided. Such imposition of identity on input data, such as images, or a stream of text is based at least in part, on the recognition and delineation of patterns it contains and their relationships. In one embodiment, the image recognition module 207 may involve measurement of the object to identify distinguishing attributes, extraction of features for the defining attributes, and comparison with known patterns to determine a match or mismatch.

In one embodiment, the buffer module 209 may enable buffering of service data determined via an alternate service (e.g., that will replace the default service as a foreground process based on performance degradation of the default service). In one scenario, the buffering of the service data may be a holding of the service data in memory storage until the service data is processed. As such, the buffered service data may be accessed upon determining the degradation of the performance of the default service.

In one embodiment, the communication module 211 may enable formation of a session over the communication network 109 between the notification platform 111 and the UE 101. For example, the communication module 211 executes various protocols and data sharing techniques for enabling collaborative execution between UE 101 and the notification platform 111 over the communication network 109.

In one embodiment, the presentation module 213 makes a presentation of task related objects in an augmented reality user interface upon receiving the data from the communication module 211. This module obtains a set of summary statistics from other modules. Then, the module continues with generating a presentation and continues with providing of presentation data set where the presentation could be depicted in one or more visual display units.

Figure 3:
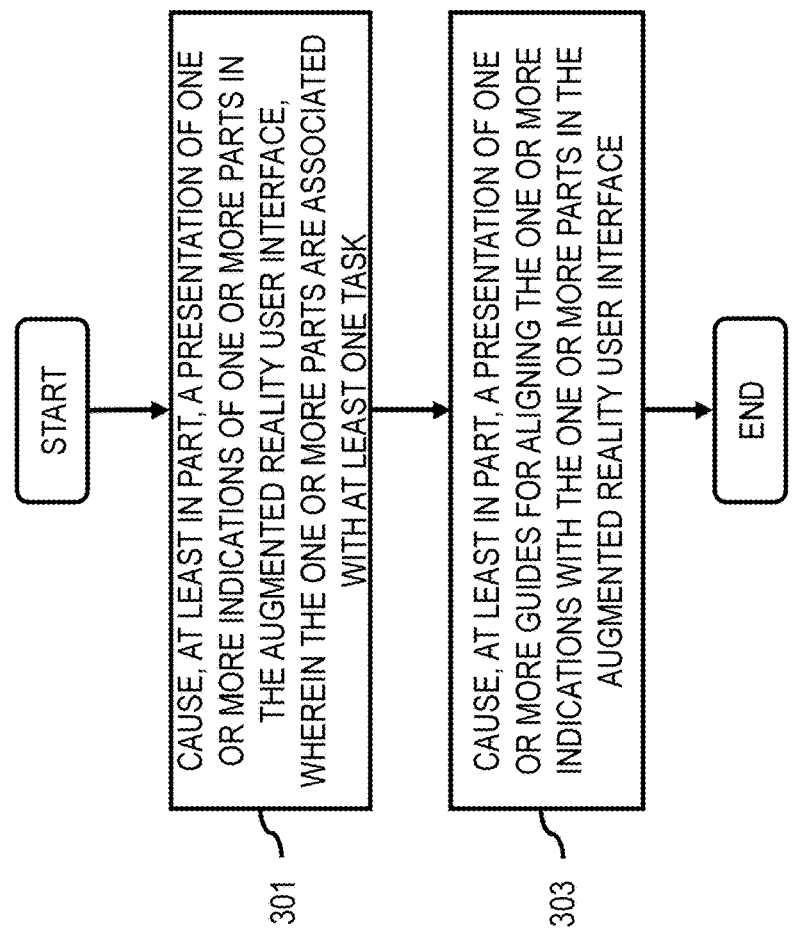
FIG. 3-5 are flowcharts of processes for causing a presentation of one or more indications of one or more parts associated with at least one task, alongside guides for aligning the one or more indications with the one or more parts in the augmented reality user interface, according to one embodiment.

FIG. 3 is a flowchart of a process for causing a presentation of one or more indications of one or more parts associated with at least one task, alongside guides for aligning the one or more indications with the one or more parts in the augmented reality user interface, according to one embodiment. In one embodiment, the notification platform 111 performs the process 300 and is implemented in, for instance, a chip set including a processor and a memory as shown in FIG. 13.

In step 301, the notification platform 111 causes, at least in part, a presentation of one or more indications of one or more parts in the augmented reality user interface, wherein the one or more parts are associated with at least one task. In one scenario, the notification platform 111 may assist an inexperienced driver in recognizing a defect in a car and may provide instruction relating to fixing the defect in an augmented reality display. In one scenario, the notification platform 111 may determine one or more information associated with the car, for instance, low oil level. Then, the notification platform 111 may determine one or more representation for the information associated with the car. Subsequently, the notification platform 111 may cause a presentation of one or more representation with one or more indications to resolve the detected defect, for instance, an outline view may be provided, wherein parts associated with the defect may be highlighted for user convenience.

In step 303, the notification platform 111 causes, at least in part, a presentation of one or more guides for aligning the one or more indications with the one or more parts in the augmented reality user interface, wherein the one or more guides indicate, at least in part, a direction, an orientation, or a combination thereof to move a device presenting the augmented reality display for aligning the one or more indications with the one or more parts. In one scenario, a user may be provided with an augmented reality display on how to change oil, such display may be accompanied with instructions that assists the users in comparing and matching the outline display with the actual parts of the car. In one scenario, a user may move around the car to compare and match the outline display.

Figure 4:
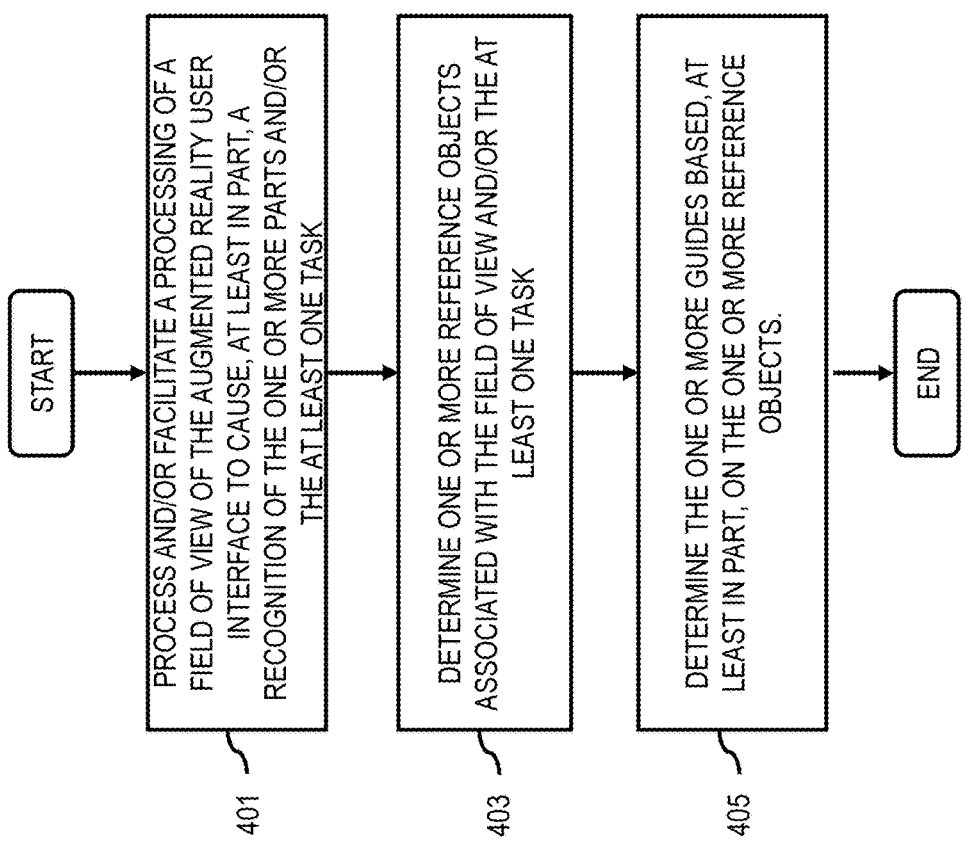

FIG. 4 is a flowchart of a process for determining the one or more guides based, at least in part, on the one or more reference objects associated with the field of view of the augmented reality user interface to cause, at least in part, a recognition of the one or more parts and/or the at least one task, according to one embodiment. In one embodiment, the notification platform 111 performs the process 400 and is implemented in, for instance, a chip set including a processor and a memory as shown in FIG. 13.

In step 401, the notification platform 111 processes and/or facilitates a processing of a field of view of the augmented reality user interface to cause, at least in part, a recognition of the one or more parts, the at least one task, or a combination thereof. In one scenario, the notification platform may process the augmented reality display for identifying parts and/or tasks, for instance, inspection stickers on the windshield of the car may be processed, and based on the processing, the notification platform 111 may alert the user that it is time to have the car serviced. In one scenario, based, at least in part, on the processing of the augmented reality display of the tires of a vehicle, the notification platform 111 may alert a user to change the tire based on the wear and tear determined from the processing of the displayed information.

In step 403, the notification platform 111 determines one or more reference objects associated with the field of view, the at least one task, or a combination thereof. In one scenario, the notification platform 111 may receive an image representing a physical environment, whereby the notification platform 111 may determine a reference object within the ambit of the physical environment. In one scenario, a user may capture an image of a car with a UE 101, whereby the notification platform 111 may process the image to determine a reference object, for instance, upon determining the car is low on oil, the notification platform 111 may determine parts of the car that is relevant for adding oil, as reference objects.

In step 405, the notification platform 111 determines the one or more guides based, at least in part, on the one or more reference objects, wherein the one or more guides include, at least in part, one or more outline representations of the one or more reference objects. In one scenario, the notification platform 111 upon determining reference objects associated with the task of oil change in a car, may provide an augmented reality display of the outline of the reference objects, which the one or more users may compare and match with the actual parts of the car.

Figure 5:
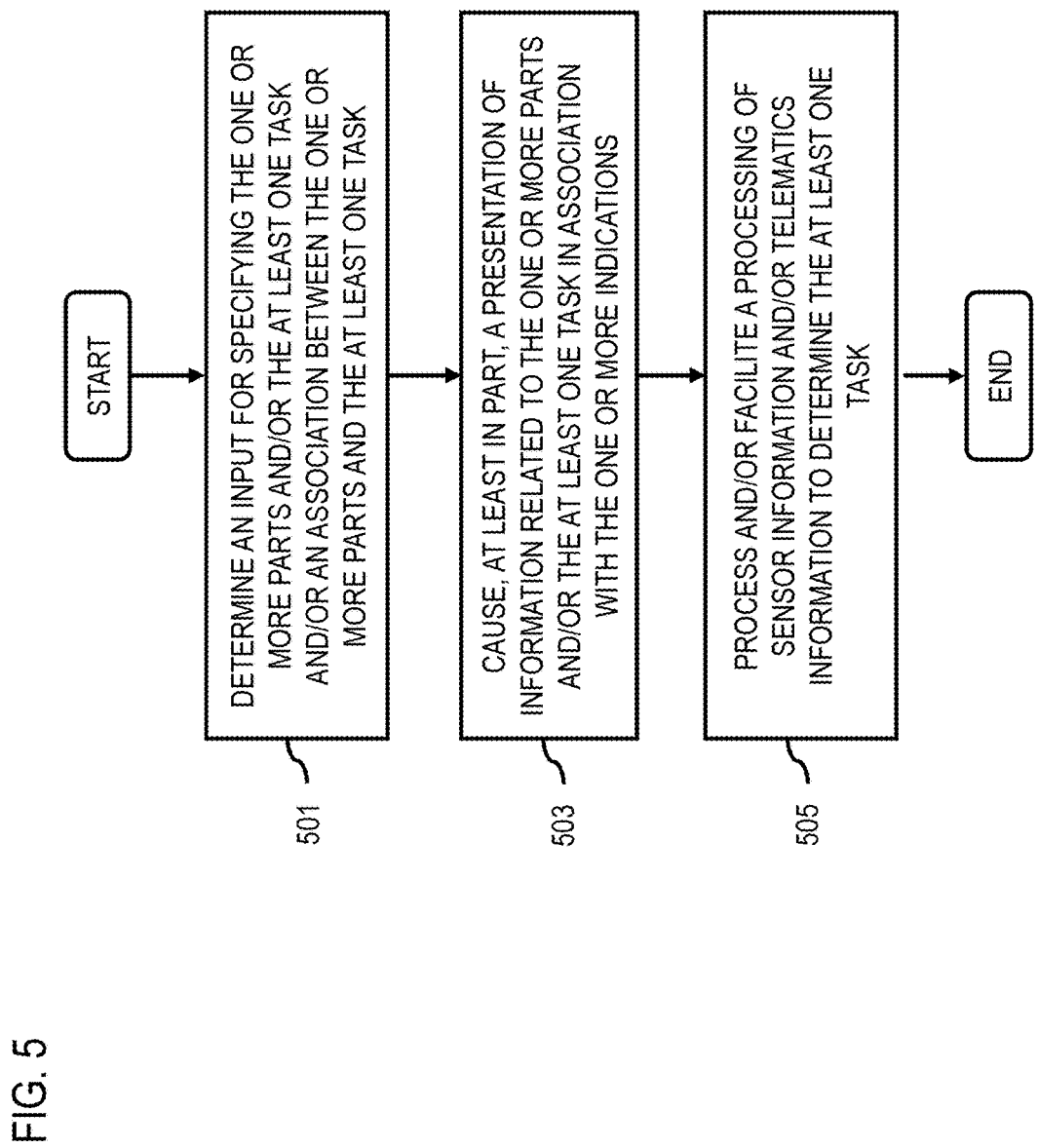

FIG. 5 is a flowchart of a process for determining an input and causing a presentation of information related to the one or more parts and/or the at least one task in association with the one or more indications, according to one embodiment. In one embodiment, the notification platform 111 performs the process 500 and is implemented in, for instance, a chip set including a processor and a memory as shown in FIG. 13.

In step 501, the notification platform 111 determines an input for specifying the one or more parts, the at least one task, an association between the one or more parts and the at least one task, or a combination thereof. In one scenario, the notification platform 111 may process and/or facilitate a processing of the one or more user actions to determine a presentation for one or more indications of one or more parts to complete a task, for instance, the notification platform 111 may display a guided augmented reality service for changing oil based, at least in part, on user approval of the request for presentation. In one scenario, the notification platform 111 may process and/or facilitate a processing of the one or more sensor information to determine a presentation for one or more indications of one or more parts, for instance, a notification platform 111 may provide users with step by step tutorial to add oil, the user does not need to skip any steps manually since the notification platform 111 may determine with the help of various sensors if a step is completed, and may move on to the next step of the tutorial display.

In step 503, the notification platform 111 causes, at least in part, a presentation of information related to the one or more parts, the at least one task, or a combination thereof in association with the one or more indications, wherein the information includes, at least in part, one or more instructions for performing at least a portion of the at least one task. In one scenario, the notification platform 111 may display plurality of parts of a vehicle in an augmented reality user interface, wherein the one or more parts are associated with the determined tasks, the associated parts may be highlighted with color patterns, labels, other user interface elements or a combination thereof.

In step 505, the notification platform 111 processes and/or facilitates a processing of sensor information, telematics information, or a combination thereof to determine the at least one task, wherein the sensor information, the telematics information, or a combination thereof is associated with at least one vehicle, and wherein the at least one task is related to the at least one vehicle. In one scenario, the notification platform 111 may receive one or more information from various sensors associated with a vehicle. Then, the notification platform 111 may determine tasks associated with the vehicle based, at least in part, on the information received from the various sensors, for instance, the notification platform 111 may determine the water level in the radiator is low, and may display task related objects in an augmented reality outline on how to add water in the radiator.

Figure 6A:
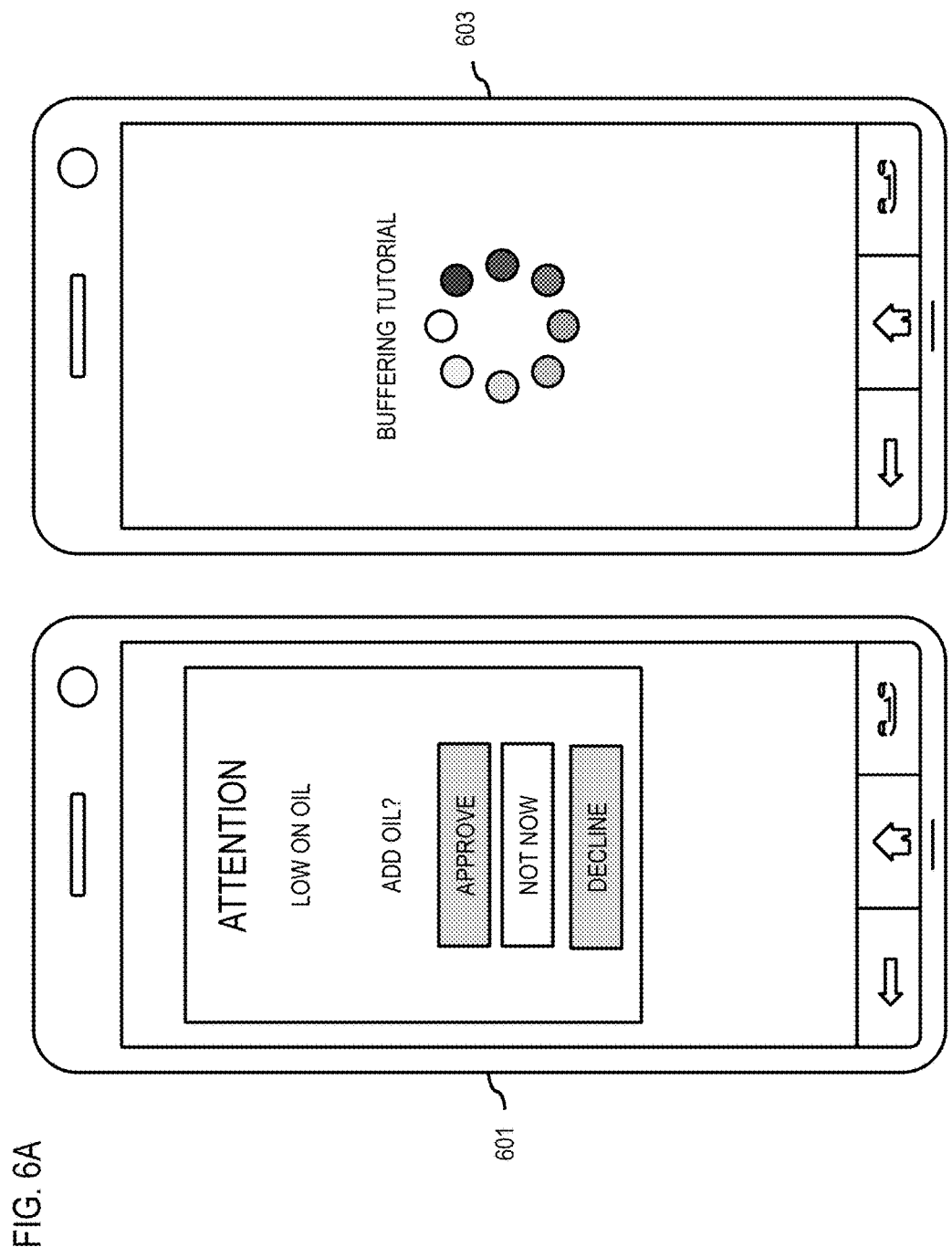

FIG. 6A is a diagram of user interface utilized in the process of FIGS. 3-5, according to various embodiments. In one scenario, the service may be used in vehicles to identify possible issues, for instance, maintenance issues such as low oil level. The notification platform 111 may determine one or more sensors associated with a vehicle to get information on the oil level. Then, the notification platform 111 may cause, at least in part, a presentation of one or more alerts in the user interface 601. As shown, the notification platform 111 may cause a presentation of an alert message "LOW ON OIL, ADD OIL?" based on, for instance, maintenance information obtained from a vehicle information system. In this example, as shown in user interface 601, a user may accept the notification to add oil (e.g., via an "approve" command), delay the task (e.g., via a "not now" command), or reject the task (e.g., via a "decline" command). If the user accepts the task, the notification platform 111 may initiate presentation of tutorial information (e.g., a tutorial video) at the user's device as shown in user interface 603. In one embodiment, the user may configure the notification platform 111 to indicate that the user is an expert user who does not need tutorial information. In this case, the notification platform 111 may omit the presentation of a tutorial.

Figure 6B:
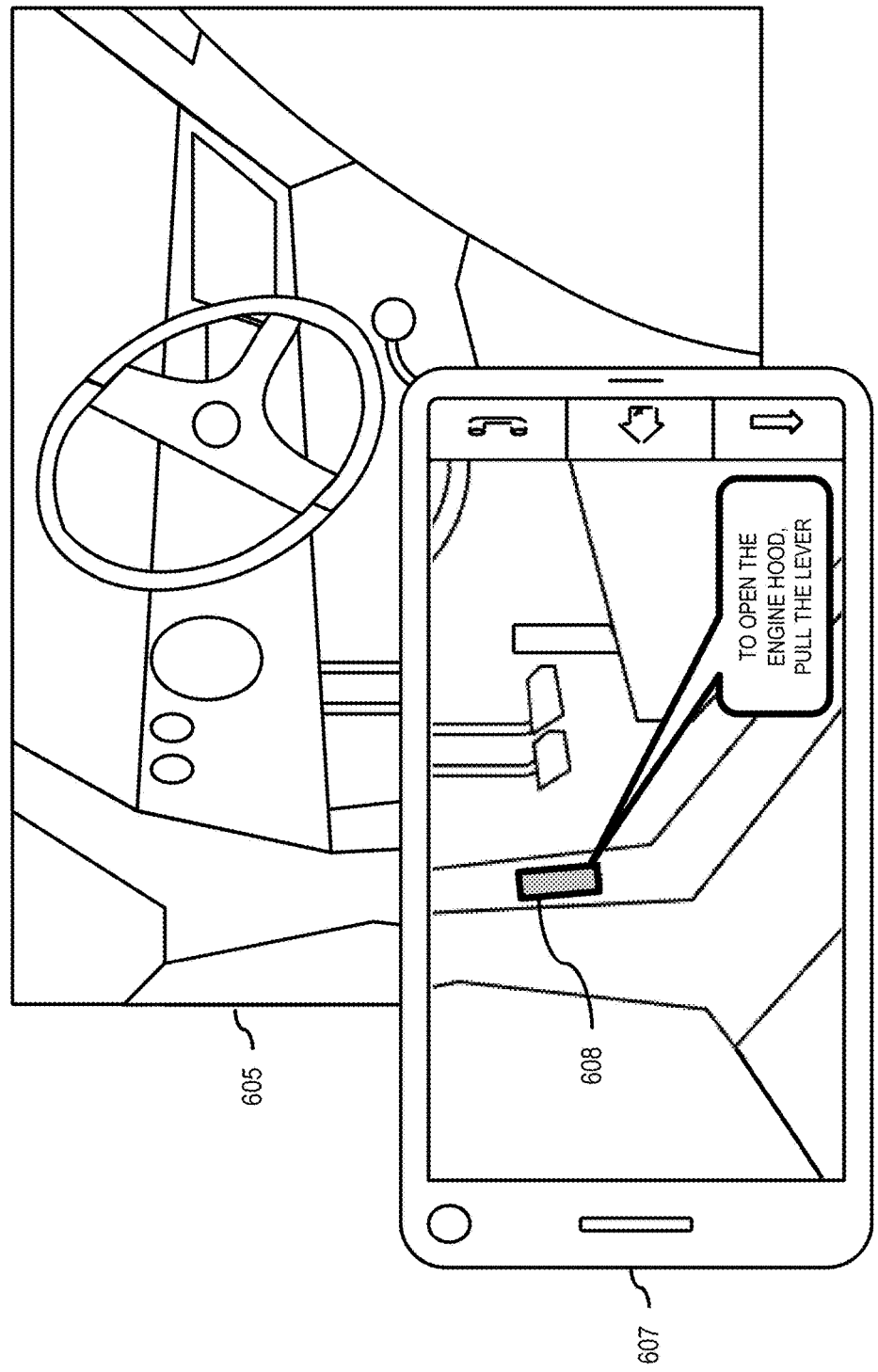

FIG. 6B is a diagram of user interface utilized in the process of FIGS. 3-5, according to various embodiments. In one scenario, notification platform 111 may cause, at least in part, a presentation of an augmented reality display 607 depicting a vehicle environment 605 upon user acceptance of the task (e.g., to add oil). In this example, the notification platform 111 provides an augmented reality display an environment 605 comprising the interior of a vehicle. In one embodiment, parts of vehicles (e.g., the hood latch 608) relevant to completing the task of adding oil may be highlighted and/or colored to offer the user guidance for completing task. For example, when the user approaches the vehicle and opens the car door to view the vehicle environment 605, the latch 608 to open the car hood may be colored red to make it easy to spot. Further, the user may be provided with instructions on how to use the latch 608, for instance, whether to push or pull the latch 608 in order to open the hood. In addition, information on the type of oil, the quantity of oil may be provided based on available information from the vehicle sensors and other sources, for instance the vehicle manual, vehicle manufacturer database, etc.

Figure 6C:
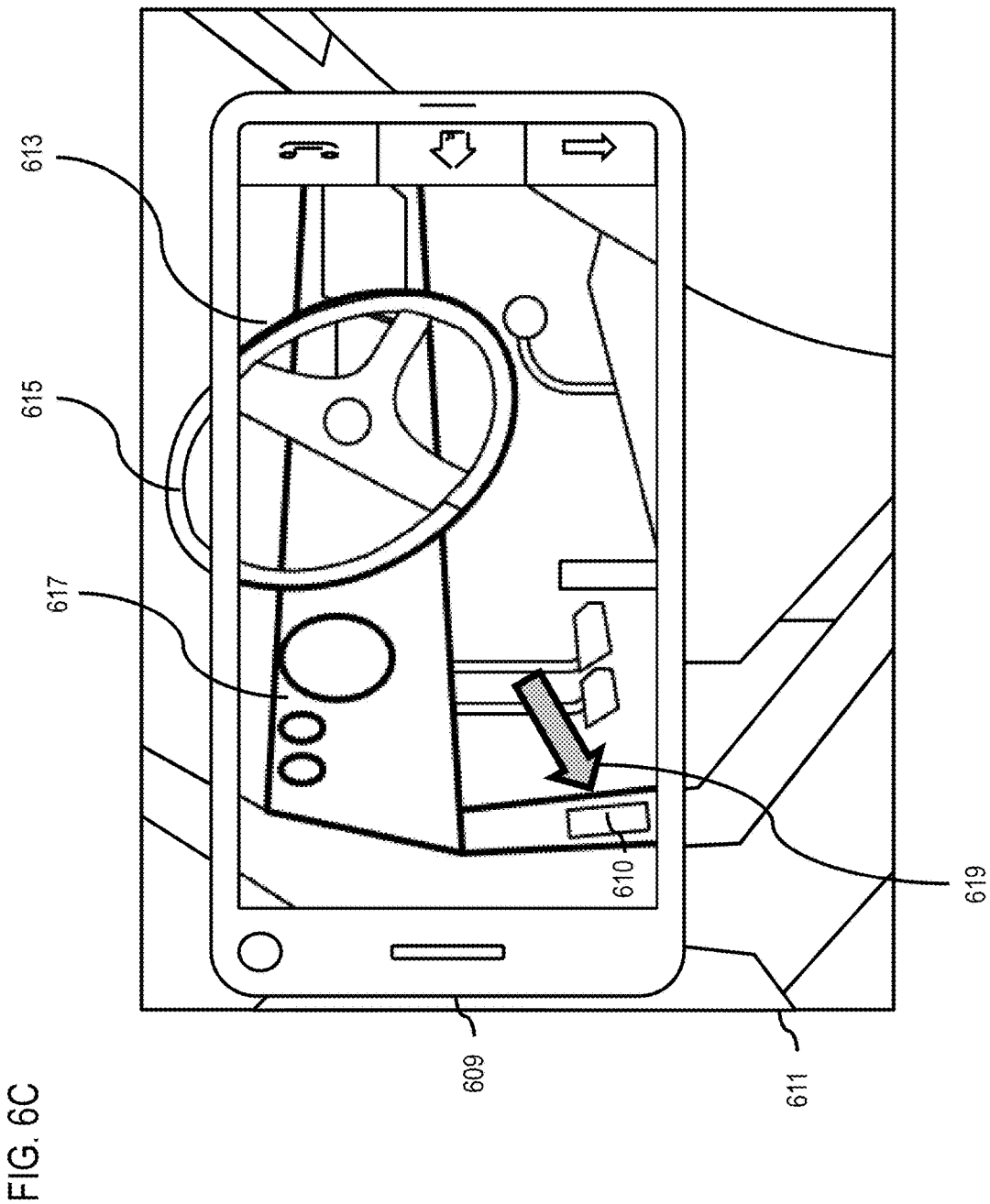

FIG. 6C is a diagram of user interface utilized in the process of FIGS. 3-5, according to various embodiments. In one scenario, as shown in FIG. 6C, the notification platform 111 presents outlines 613 of reference objects (e.g., the steering wheel 615 and dashboard 617) that serve guides for a user to move the UE 609 to align the field of view of an augmented reality display. In one embodiment, the alignment of the outlines 613 with the respective objects 615 and 617 will also result in alignment of an indicator 619 that directs the user's attention to relevant parts (e.g., a latch 610 for opening the car's hood) to complete a task. By way of example, the notification platform 111 may select any reference objects that are potentially visible through a field of view 611 of an augmented reality display. In this example, the notification platform 111 selected the steering wheel 615 and dashboard 617 as the reference objects for generating the outlines 613 because they are traditionally easily recognizable by a user. In addition, by providing outlines 613 as alignment guides for the user, the notification platform 111 avoids a need to sense or recognize the reference objects through, for instance, machine image recognition techniques that can potentially tax the resources of the UE 609. Instead, the outlines 613 enable the user to visually recognize the proper alignment of the references, thereby reducing the resource burden on the UE 609.

Once the outlines 613 are aligned with the objects 615 and 617 as visible in the augmented reality display, the user will also be in a position to view the indicator arrow 619 in proper relation to the latch 610. In this example, the notification platform 111 causes a display of parts (e.g., latch 610) relevant to a task comprising adding oil to a vehicle. As a first step, the user is provided the outlines 613 to direct the user to actuate the latch 610 to open the hoop to reach the oil filler cap. In one embodiment, the task can be initiated by interfacing with a vehicle information system to obtain vehicle maintenance information (e.g., oil level). In one scenario, the notification platform 111 may highlight (e.g., via the indicator arrow 619) a latch 610 which unlocks the hood of the car for access to the engine. It is contemplated that the latch 610 may be emphasized or highlighted in various ways in the augmented reality user interface of the UE 609 (e.g., by colors, labels, etc.) for easy identification.

In another scenario, if sensor information from the UE 609 is available, the notification platform 111 may cause a presentation of the augmented reality view based, at least in part, on the position of the vehicle and/or the direction of the user and/or the angle of UE 101. For example, the notification platform 111 may use the sensor information as rough estimated for determine the approximate positions of the outlines 613. In this way, the outlines 613 may be more closely matched with what is visible the field of view 611, and the user need make relatively minor adjustments to align the outlines 613 with the respective objects 615 and 617.

FIG. 6D is a diagram of user interface utilized in the process of FIGS. 3-5, according to various embodiments. In one scenario, the notification platform 111 may provide a display 621 of different parts of the vehicle 623, and emphasize on the parts that are used to complete a maintenance task (e.g., to add oil). The user may compare the representation of the parts of the vehicle to the actual vehicle to determine a match. In one scenario, a user may be provided with a step by step guide to change the oil in an augmented reality display. The notification platform 111 may process and/or facilitate a processing of the one or more user actions to determine a presentation for one or more representations of the vehicle parts. In one scenario, a user does not need to skip any steps manually, the notification platform 111 adapts to the situation, for example, if the engine hood is already open as detected by the sensors, the previous step for opening the engine hood is not displayed.

Figure 6E:
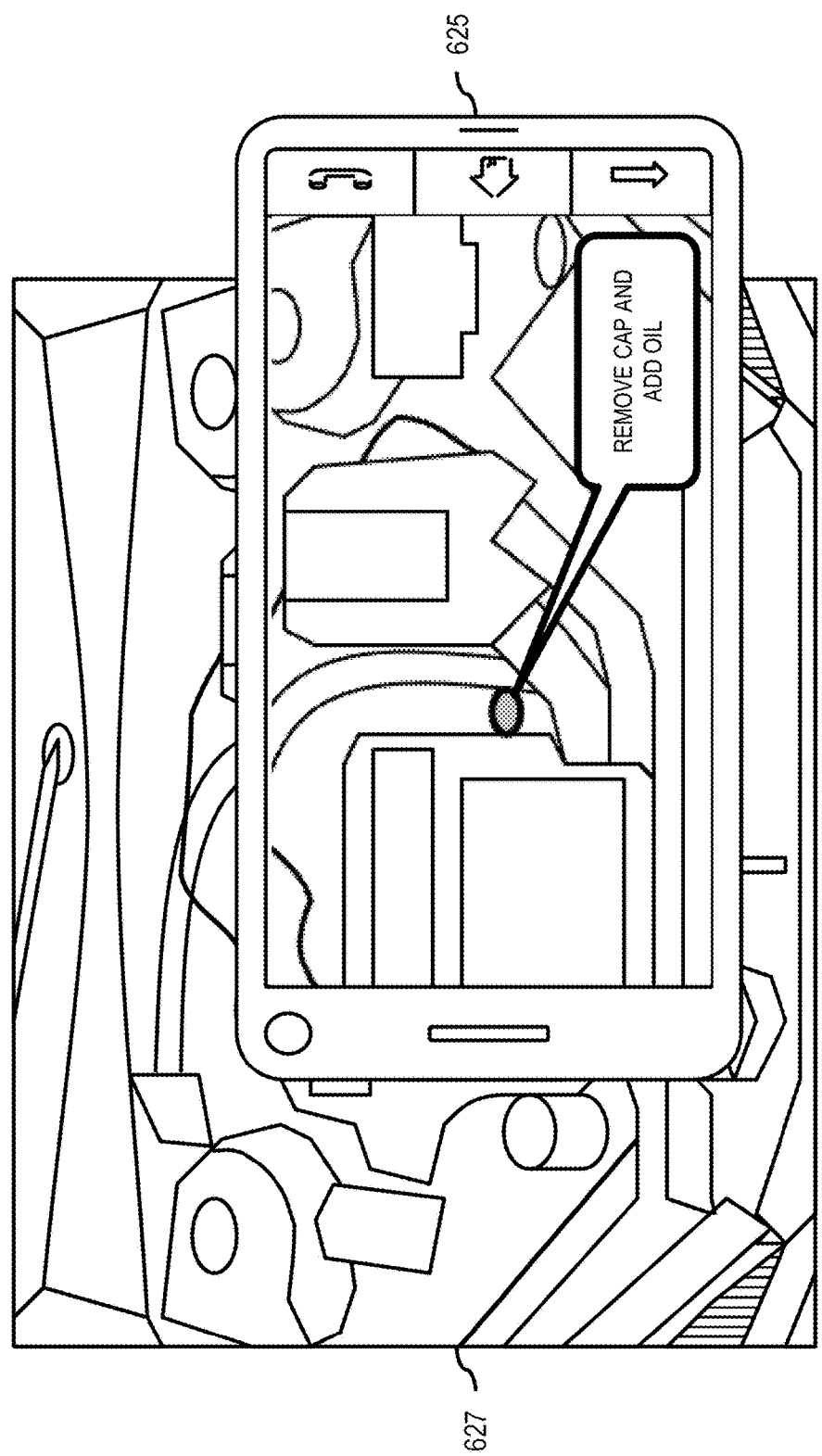

FIG. 6E is a diagram of user interface utilized in the process of FIGS. 3-5, according to various embodiments. In one scenario, the notification platform 111 may provide the next display 625 of an engine 627 to assist in completing the task to add oil based, at least in part, on user actions and/or the information received from the sensors. In one scenario, upon determining that the hood of the car has been opened by the user (e.g., via image recognition techniques, user input, etc.), the notification platform 111 may provide an augmented reality display of the task-related objects, whereby the user may identify the engine part because it has either been highlighted with color and/or labeled. In addition, the instructions provided during the augmented reality display to the user enhance user convenience.

Figure 6F:
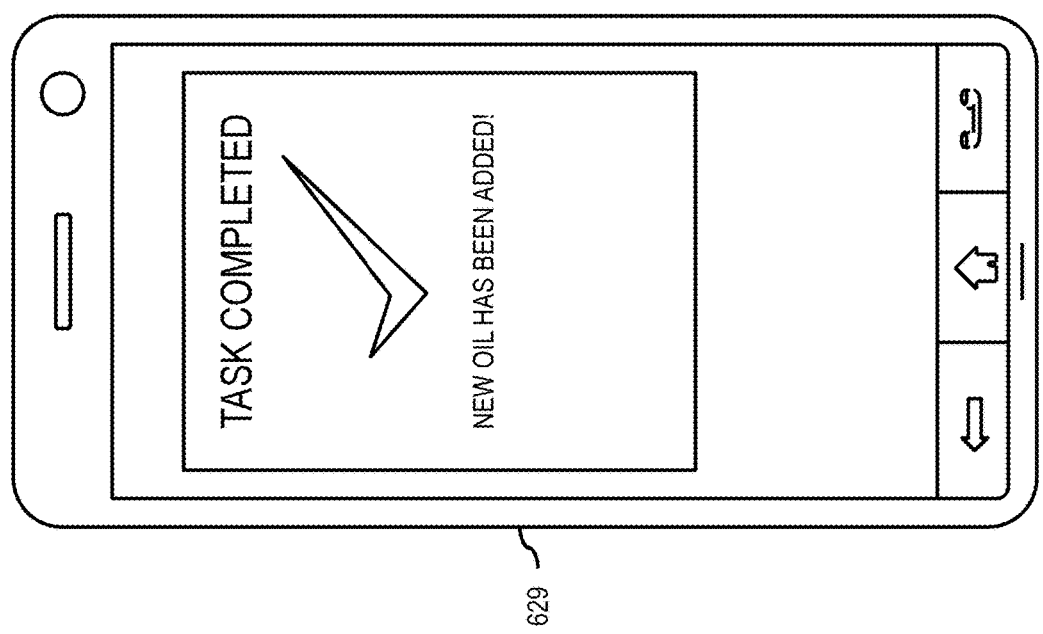

FIG. 6F is a diagram of user interface utilized in the process of FIGS. 3-5, according to various embodiments. In one scenario, the sensors of the vehicle may provide the notification platform 111 with the information that the task of adding oil has been completed by the user, whereby the notification platform 111 provides the user with an alert 629 that the task has been completed.

The processes described herein for causing a presentation of one or more indications of one or more parts associated with at least one task, alongside guides for aligning the one or more indications with the one or more parts in the augmented reality user interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
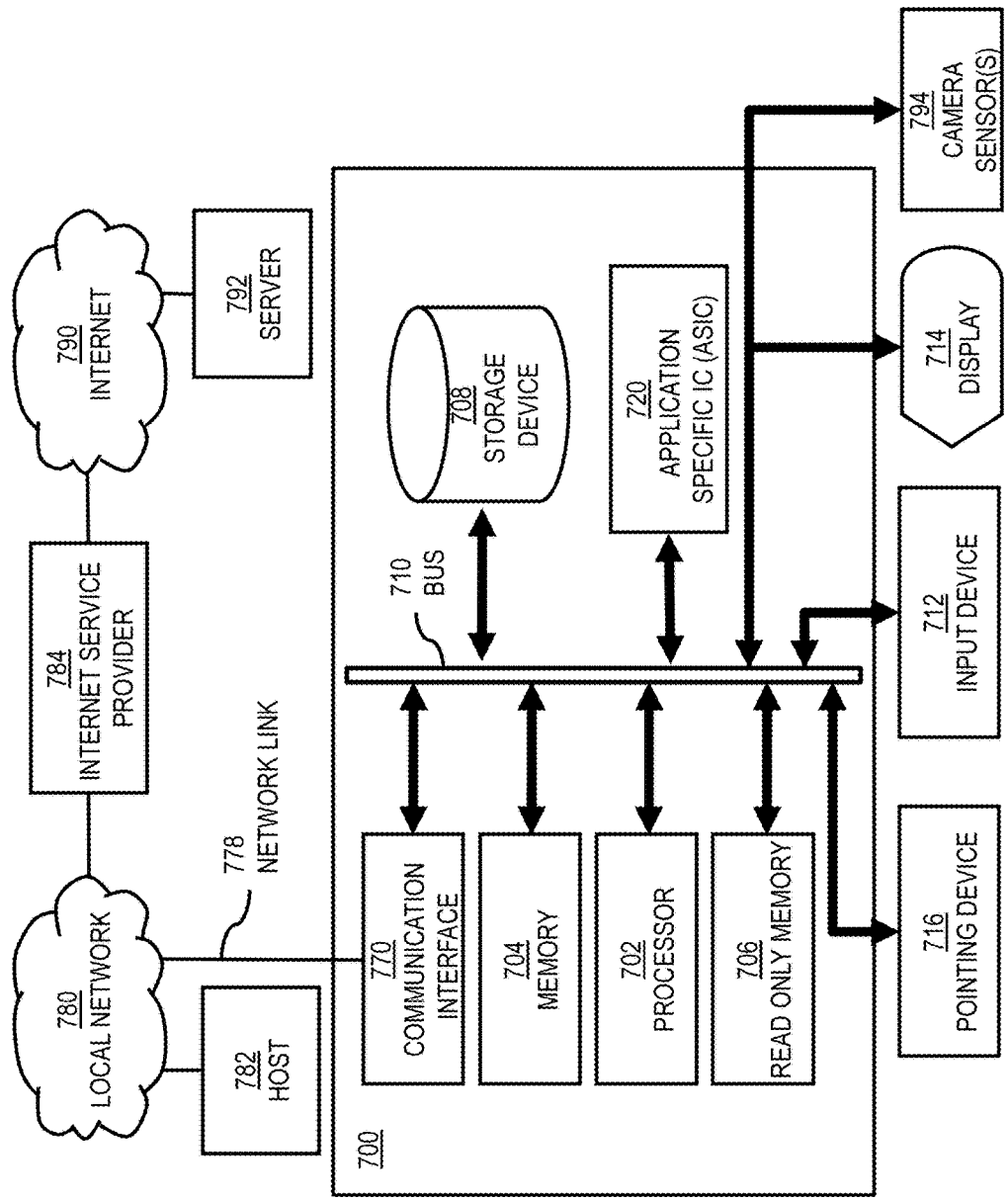
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to cause a presentation of one or more indications of one or more parts associated with at least one task, alongside guides for aligning the one or more indications with the one or more parts in the augmented reality user interface as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of causing a presentation of one or more indications of one or more parts associated with at least one task, alongside guides for aligning the one or more indications with the one or more parts in the augmented reality user interface.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to causing a presentation of one or more indications of one or more parts associated with at least one task, alongside guides for aligning the one or more indications with the one or more parts in the augmented reality user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for causing a presentation of one or more indications of one or more parts associated with at least one task, alongside guides for aligning the one or more indications with the one or more parts in the augmented reality user interface. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for causing a presentation of one or more indications of one or more parts associated with at least one task, alongside guides for aligning the one or more indications with the one or more parts in the augmented reality user interface, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714, and one or more camera sensors 794 for capturing, recording and causing to store one or more still and/or moving images (e.g., videos, movies, etc.) which also may comprise audio recordings. In some embodiments, for example, in embodiments in which the computer system 700 performs all functions automatically without human input, one or more of external input device 712, display device 714 and pointing device 716 may be omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 109 for causing a presentation of one or more indications of one or more parts associated with at least one task, alongside guides for aligning the one or more indications with the one or more parts in the augmented reality user interface to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
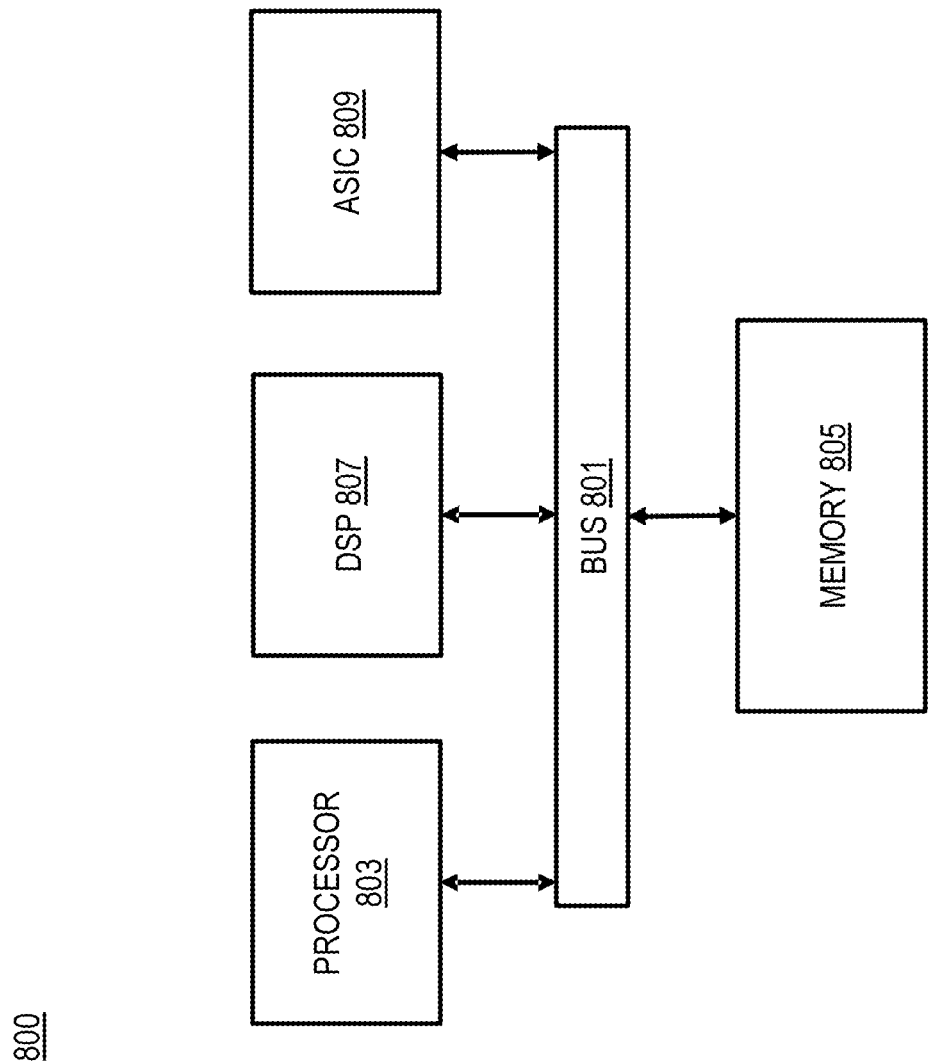
FIG. 8 is a diagram of a chip set that can be used to implement an embodiment of the invention.

FIG. 8 illustrates a chip set or chip 800 upon which an embodiment of the invention may be implemented. Chip set 800 is programmed to cause a presentation of one or more indications of one or more parts associated with at least one task, alongside guides for aligning the one or more indications with the one or more parts in the augmented reality user interface, as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of causing a presentation of one or more indications of one or more parts associated with at least one task, alongside guides for aligning the one or more indications with the one or more parts in the augmented reality user interface.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to cause a presentation of one or more indications of one or more parts associated with at least one task, alongside guides for aligning the one or more indications with the one or more parts in the augmented reality user interface. The memory 805 also stores the data associated with or generated by the execution of the inventive steps.

Figure 9:
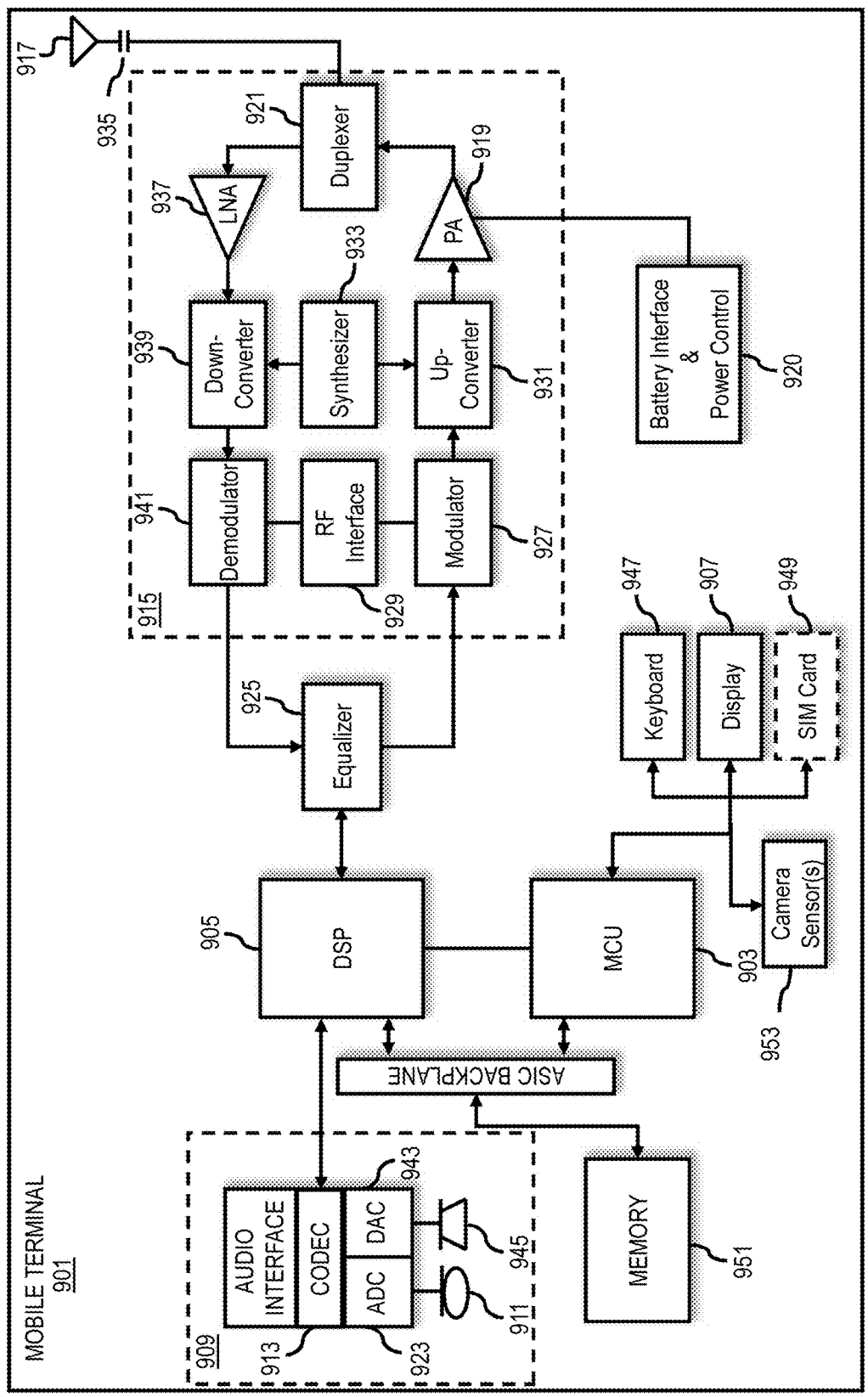
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of causing a presentation of one or more indications of one or more parts associated with at least one task, alongside guides for aligning the one or more indications with the one or more parts in the augmented reality user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of causing a presentation of one or more indications of one or more parts associated with at least one task, alongside guides for aligning the one or more indications with the one or more parts in the augmented reality user interface. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to cause a presentation of one or more indications of one or more parts associated with at least one task, alongside guides for aligning the one or more indications with the one or more parts in the augmented reality user interface. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Further, one or more camera sensors 953 may be incorporated onto the mobile station 901 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   initiating, by an apparatus, one or more indications of one or more parts in a plurality of augmented reality user interfaces of respective user devices, wherein the one or more parts are associated with at least one task associated with a vehicle to be performed via coordinated actions of users of the respective user devices, and wherein each of the augmented reality user interfaces comprises an electronic display of a camera;
   initiating, by the apparatus, one or more guides for alignment of the one or more indications with the one or more parts respectively in the augmented reality user interfaces corresponding to the coordinated actions to be performed by the users, wherein the alignment is realized by movement of the respective augmented reality user interface to align the one or more indications with the one or more parts located in real space, and wherein the electronic display allows the respective user to view the augmented reality user interface during the alignment and while performing the coordinated actions;
   processing, by the apparatus, sensor information, telematics information, or a combination thereof collected at the user devices, the vehicle, or a combination thereof to determine the coordinated actions;
   initiating, by the apparatus in response to the sensor information, the telematics information, or a combination thereof, a presentation in the electronic display of a tutorial video via one or more networks, wherein the tutorial video is a step by step guide to perform the coordinated actions as steps; and
   upon determining based on the sensor information, the telematics information, or a combination thereof that one step shown on one of the user devices is completed by one of the users that uses the user device, initiating, by the apparatus, real-time skipping the step from the presentation of the tutorial video on the remaining one or more user devices and presenting a next step of the tutorial video on the remaining one or more user devices,
   wherein the different steps of the tutorial video are presented among the user devices based, at least in part, on the real-time skipping.

2. A method of claim 1, further comprising:
   processing a field of view of the respective augmented reality user interface to cause, at least in part, a recognition of the one or more parts, the at least one task, or a combination thereof.

3. A method of claim 2, further comprising:
   determining one or more reference objects associated with the field of view, the at least one task, or a combination thereof; and
   determining the one or more guides based, at least in part, on the one or more reference objects.

4. A method of claim 3, wherein the one or more guides include, at least in part, one or more outline representations of the one or more reference objects.

5. A method of claim 1, wherein the one or more guides indicate, at least in part, a direction, an orientation, or a combination thereof to move the respective user device presenting the respective augmented reality user interface for aligning the one or more indications with the one or more parts.

6. A method of claim 1, further comprising:
determining an input for specifying the one or more parts, the at least one task, an association between the one or more parts and the at least one task, or a combination thereof.

7. A method of claim 1, wherein the apparatus is a server or a platform that communicates with the user devices via the one or more networks.

8. A method of claim 1, wherein the apparatus is included in one of the user devices communicating with the other one or more of the user devices via one or more short range communication networks included in the one or more networks.

9. A method of claim 8, wherein the one or more short range communication networks are established via tapping the one user device with the other one or more user devices.

10. An apparatus comprising:
at least one processor; and
at least one memory including computer program code for one or more programs,
the at least one memory and the computer program code configured to, with the at least one processor, cause the apparatus to perform at least the following,
initiate one or more indications of one or more parts in a plurality of augmented reality user interfaces of respective user devices, wherein the one or more parts are associated with at least one task associated with a vehicle to be performed via coordinated actions of users of the respective user devices, and wherein each of the augmented reality user interfaces comprises an electronic display of a camera;
initiate one or more guides for alignment of the one or more indications with the one or more parts respectively in the augmented reality user interfaces corresponding to the coordinated actions to be performed by the users, wherein the alignment is realized by movement of the respective augmented reality user interface to align the one or more indications with the one or more parts located in real space, and wherein the electronic display allows the respective user to view the augmented reality user interface during the alignment and while performing the coordinated actions;
process sensor information, telematics information, or a combination thereof collected at the user devices, the vehicle, or a combination thereof to determine the coordinated actions;
initiate, in response to the sensor information, the telematics information, or a combination thereof, a presentation in the electronic display of a tutorial video via one or more networks, wherein the tutorial video is a step by step guide to perform the coordinated actions as steps; and
upon determining based on the sensor information, the telematics information, or a combination thereof that one step shown on one of the user devices is completed by one of the users that uses the user device, initiate real-time skipping the step from the presentation of the tutorial video on the remaining one or more user devices and presenting a next step of the tutorial video on the remaining one or more user devices,
wherein the different steps of the tutorial video are presented among the user devices based, at least in part, on the real-time skipping.

11. An apparatus of claim 10, wherein the apparatus is further caused to:
process a field of view of the respective augmented reality user interface to cause, at least in part, a recognition of the one or more parts, the at least one task, or a combination thereof.

12. An apparatus of claim 11, wherein the apparatus is further caused to:
determine one or more reference objects associated with the field of view, the at least one task, or a combination thereof; and
determine the one or more guides based, at least in part, on the one or more reference objects.

13. An apparatus of claim 12, wherein the one or more guides include, at least in part, one or more outline representations of the one or more reference objects.

14. An apparatus of claim 10, wherein the one or more guides indicate, at least in part, a direction, an orientation, or a combination thereof to move the respective user device presenting the respective augmented reality user interface for aligning the one or more indications with the one or more parts.

15. An apparatus of claim 10, wherein the apparatus is further caused to:
determine an input for specifying the one or more parts, the at least one task, an association between the one or more parts and the at least one task, or a combination thereof.

16. An apparatus of claim 10, wherein the apparatus is a server or a platform that communicates with the user devices via the one or more networks.

17. An apparatus of claim 10, wherein the apparatus is included in one of the user devices communicating with the other one or more of the user devices via one or more short range communication networks included in the one or more networks.

18. An apparatus of claim 17, wherein the one or more short range communication networks are established via tapping the one user device with the other one or more user devices.

* * * * *